United States Patent [19]

Yamazaki

[11] 4,266,172
[45] May 5, 1981

[54] TRACER CONTROL SYSTEM

[75] Inventor: Etuo Yamazaki, Hachioji, Japan

[73] Assignee: Fujitsu Fanuc Limited, Japan

[21] Appl. No.: 32,695

[22] Filed: Apr. 23, 1979

[30] Foreign Application Priority Data

Apr. 24, 1978 [JP] Japan .................................. 53/49065

[51] Int. Cl.³ ............................................ G05B 19/37
[52] U.S. Cl. ....................................... 318/578; 318/39; 318/571
[58] Field of Search ........................... 318/39, 571, 578

[56] References Cited

U.S. PATENT DOCUMENTS

| | | | |
|---|---|---|---|
| 3,975,667 | 8/1976 | Bory et al. | 318/39 |
| 4,064,445 | 12/1977 | Wenzel | 318/578 |
| 4,157,679 | 6/1979 | Wenzel | 318/578 X |
| 4,164,694 | 8/1979 | Amsbury | 318/578 |

Primary Examiner—B. Dobeck
Attorney, Agent, or Firm—Staas & Halsey

[57] ABSTRACT

In a tracer control system in which tracer head control is switched over from a quick feed mode to a deceleration mode of operation to alleviate a shock when the stylus of the tracer head contacts the model, the amount of change in the configuration of the model at a profiling start point is detected to control the point of switching over the quick feed mode to the deceleration mode of operation for the next profiling start point in accordance with the detected value, thereby to ensure that the above mentioned mode switching is always accomplished at substantially a constant position relative to the profiling start point on the model surface so as to shorten the profiling time.

9 Claims, 6 Drawing Figures

TRACER CONTROL SYSTEM

BACKGROUND OF THE INVENTION

1. Field of the Invention

This invention relates to a tracer control system which automatically controls the position of start of deceleration control which takes place immediately before a stylus of a tracer head moves into contact with a model.

2. Description of the Prior Art

In one-way profiling, a tracer head is returned by a quick feed operation from a terminate point to a profiling start point in order to shorten the working time. At the profiling start point the tracer head is subjected to deceleration control immediately before its stylus contacts a model to prevent the tracer head from being damaged and a tool from cutting into a workpiece. FIG. 1 explains the path of movement of the tracer head in this tracer control. The profiling start point is detected by a limit switch LSc and the profiling terminate point is detected by a limit switch LSa and a period A is a profiling period. When limit switch LSa detects that the tracer head has reached the profiling terminate point, a quick feed operation is accomplished in such a direction that the tracer head moves away from the model. When limit switch LSb detects that the tracer head has been raised to its uppermost position, a feed axis is changed over to effect a quick feed of the tracer head to the side of the profiling start point. When limit switch LSc detects that the tracer head has returned to the profiling start point, the feed axis switching is accomplished to quickly feed the tracer head towards the model.

On the path of this approach, a limit switch LSd is provided and, upon actuation of the limit switch LSd, deceleration control is effected to switch the quick feed operation to an ordinary approach operation. Then, when the stylus of the tracer head contacts the model, a pick feed is performed by a detection signal from the tracer head and, after a predetermined amount of pick feed is effected, the feed axis is switched to start tracing of the model with the tracer head. Accordingly, reference characters B, C and D indicate quick feed periods, E a deceleration period and F a pick feed period.

The above-mentioned limit switches LSa through LSd are fixedly disposed in advance with respect to the configuration of the model; in particular, the limit switch LSd is positioned in relation to the deceleration characteristic so that the stylus is brought into contact with the model at a predetermined feed speed.

In such conventional tracer control, when the shape of a model MDL is inclined in the pick feed direction as shown in FIG. 2, since the deceleration control is accomplished upon actuation of the limit switch LSd, the deceleration period E gradually increases, as indicated by E'. In other words, the deceleration period becomes unnecessarily long and affects the working time.

SUMMARY OF THE INVENTION

An object of this invention is to shorten the profiling time.

Another object of this invention is to shorten the working time by making substantially constant the deceleration period in which a stylus of a tracer head is brought into contact with a model.

Briefly, in a tracer control system in which tracer head control is switched from a quick feed mode to a deceleration mode of operation, to alleviate a shock when the stylus of the tracer head contacts the model, the amount of change in the configuration of the model at a profiling start point is detected to control the point of switching from the quick feed mode to the deceleration mode of operation for the next profiling start point. Thus, the above-mentioned mode switching is always accomplished at a substantially constant position relative to the profiling start point on the model surface.

DESCRIPTION OF THE PREFERRED EMBODIMENTS

Figure 1:
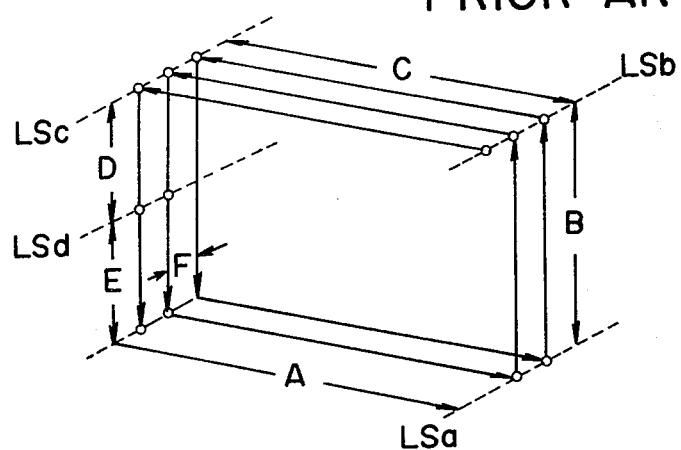
FIGS. 1 and 2 explain a path of movement of a tracer head in conventional one-way tracer control.
Figure 2:
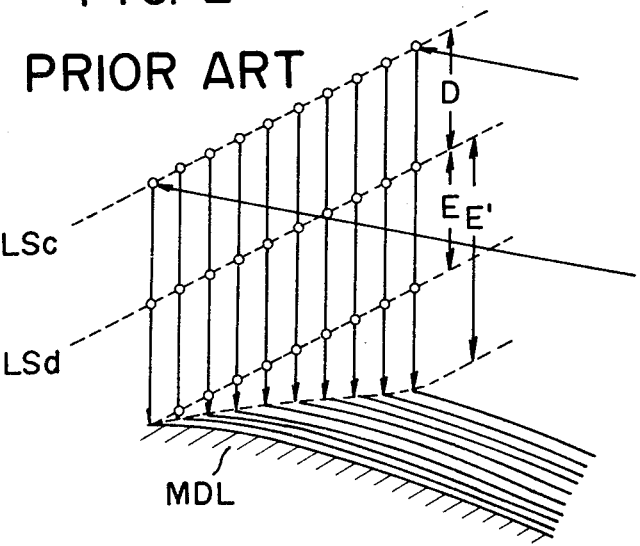
Figure 3:
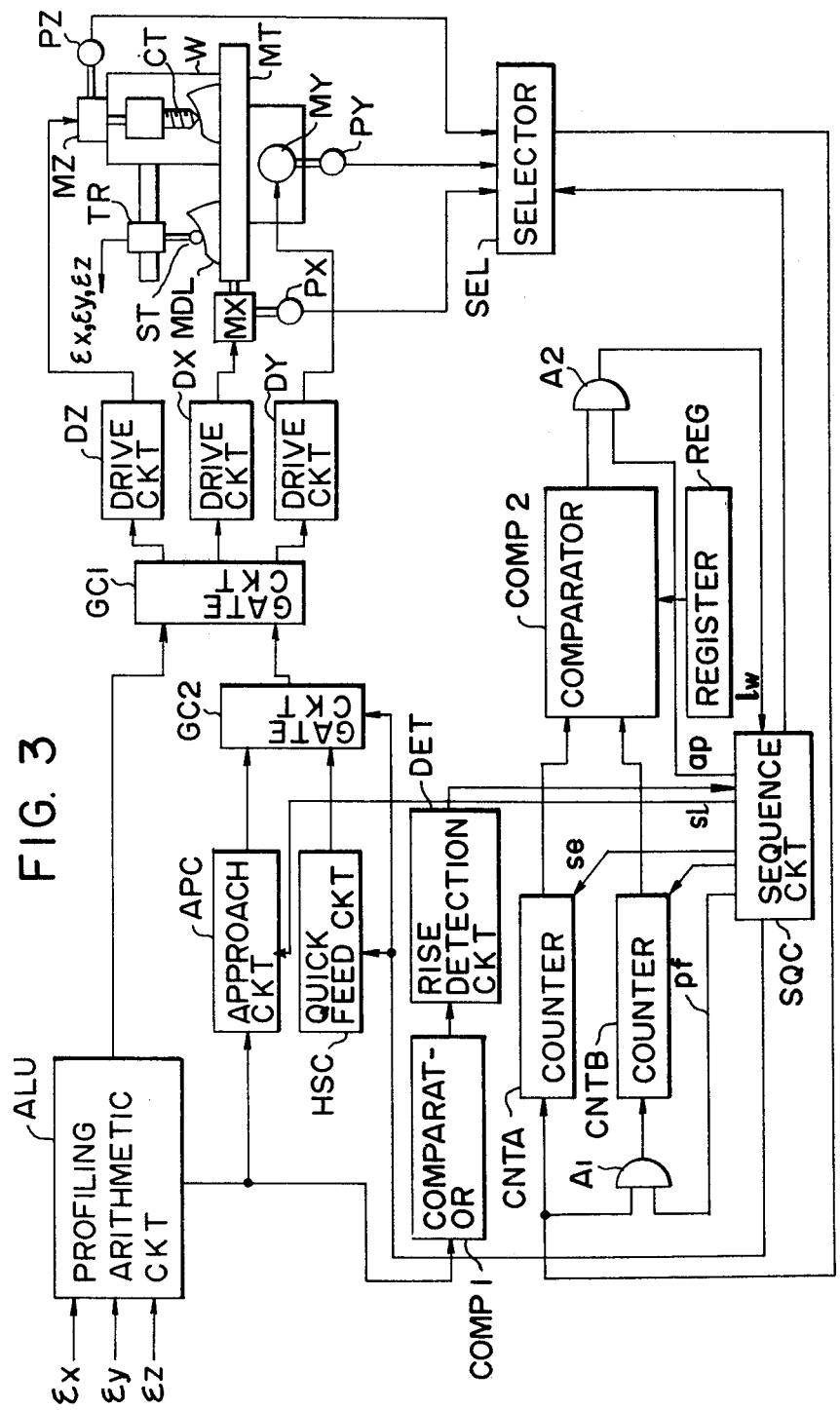
FIG. 3 is a block diagram illustrating an embodiment of this invention.

In FIG. 3 showing in block form an embodiment of this invention, reference character MT indicates a movable machine part; MX, MY and MZ designate motors; PX, PY and PZ identify position detectors, such as position coders or the like; TR denotes a tracer head; ST represents a stylus; MDL shows a model; CT refers to a cutter; W indicates a workpiece; SEL designates a selector; SQC identifies a sequence circuit; DX, DY and DZ denote motor drive circuits; GC1 and GC2 represent gate circuits; ALU shows a profiling arithmetic circuit; APC refers to an approach circuit; HSC indicates a quick feed circuit; COMP1 and COMP2 designate comparators; DET identifies a rise detection circuit; CNTA and CNTB denote counters; REG represents a register; and A1 and A2 show AND circuits.

Control is well known in which detection signals $\epsilon_x$, $\epsilon_y$ and $\epsilon_z$ of the tracer head TR are applied to the profiling arithmetic circuit ALU to calculate a feed direction and a feed speed for machining the workpiece W profiling the configuration of the model MDL; therefore, no detailed description will be given of this control.

Figure 4:
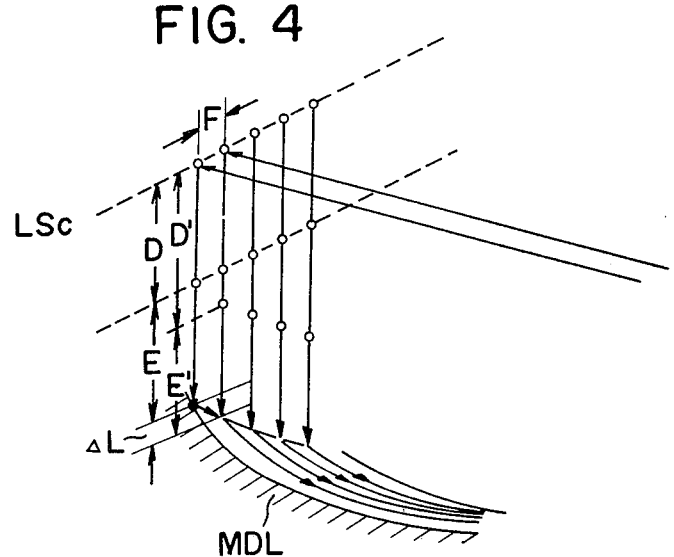
FIG. 4 explains the operation of the embodiment shown in FIG. 3.

FIG. 4 is explanatory of the operation of the embodiment depicted in FIG. 3. When it is detected by the limit switch LSc that the tracer head TR has been brought back to the profiling start point by a horizontal quick feed operation, the sequence circuit SQC sets a rapid approach signal ap to "1" and controls the gate circuit GC2 to apply therethrough a signal from the quick feed circuit HSC to the gate circuit GC1, which controls the motor drive circuit DZ to drive the motor MZ, thereby lowering the tracer head TR in a quick feed mode of operation.

By the selector SEL operating on a control signal from the sequence circuit SQC, a detection signal from the position detector PZ is selected and provided to the counter CNTA. The content of counter CNTA is zero when the tracer head TR is at the profiling start point; thus, the counter CNTA indicates the current position of the tracer head TR in the Z-axis direction. Assuming that the register REG has set therein the value of the quick feed period D and that the counter CNTB is initially set at zero at the profiling start point and indicates the position of the tracer head TR on the model surface in the pick feed direction during profiling, and assuming a, b and c represent the contents of the counters CNTA and CNTB and the register REG, respectively, the comparator COMP2 compares their contents and produces an output "1" when a condition, a−b=c, is satisfied. Accordingly, when the content b of the counter CNTB is initially set at zero, if a quick feed takes place in the quick feed section D, the AND circuit A2 provides an output "1", which is applied as a deceleration signal lw to the sequence circuit SQC to set a decelerated approach signal sl to "1".

When the decelerated approach signal sl becomes "1", the quick feed circuit HSC is switched off by the gate circuit GC2 and the approach circuit APC is employed to shift to deceleration control, thereby driving the motor MZ at a low speed. When the stylus ST contacts the model MDL, the tracer head TR provides a detection signal and the profiling arithmetic circuit ALU produces a signal of the difference between a displacement signal $\epsilon$ and a reference displacement signal $\epsilon_0$, where $\epsilon = \sqrt{\epsilon_x + \epsilon_y + \epsilon_z}$.

When the displacement signal $\epsilon$ becomes equal to the reference displacement signal $\epsilon_0$, the approach circuit APC stops its operation and the comparator COMP1 detects that $\epsilon - \epsilon_0 = 0$. The rise of the detection signal is detected by the rise detection circuit DET and applied to the sequence circuit SQC, thereby to initiate the pick feed. During the pick feed, a pick feed signal pf is "1" to open the AND circuit A1 and output pulses of the position detector PZ are selected by the selector SEL and provided to the counters CNTA and CNTB for counting at the same time. The count value of the counter CNTB at the moment of completion of the pick feed in this case corresponds to $\Delta L$ as shown in FIG. 4. In other words, the tracer head TR lowers by $\Delta L$ due to a shift of the pick feed distance in the section F and $\Delta L$ is stored as $-\Delta L$.

Then, profiling of the surface of the model MDL is achieved and during profiling the pick feed signal pf is "0", so that counter CNTB holds the count content $\Delta L$. When it is detected by the limit switch LSc that the tracer head TR has been returned by the quick feed from the profiling terminate point to the profiling start point, as described previously, a reset signal se is provided from the sequence circuit SQC to the counter CNTA to reset it and, at the same time, a quick-feed approach by the quick feed circuit HSC is initiated. During this approach, the output pulses from the position detector PZ are counted by the counter CNTA and the comparator COMP2 performs the calculation, a−b=c, for decision, as mentioned previously. Since the content of the counter CNTB is $-\Delta L$, when the quick feed is achieved over a distance, $D-(-\Delta L)=D'$, in FIG. 4, the deceleration signal lw becomes "1" and the distance of deceleration becomes such that $E=E'$.

As a result of this, the tracer head TR is fed at a decreased speed to bring the stylus ST into contact with the model MDL, and when the pick feed is started, the counters CNTA and CNTB count the output pulses from the position detector PZ. Consequently, the count content of the counter CNTB indicates the position of the stylus ST on the surface of the model MDL on the basis of the point where the stylus ST contacts the model MDL in the first approach thereto, and when the surface of the model MDL gradually rises, the count content of the counter CNTB is added with $+\Delta L$.

The moment of the deceleration lw becoming "1" as mentioned previously corresponds to the surface configuration of the model MDL at the profiling start point and the distance of deceleration is made constant at all times, permitting shortening of the time necessary for working.

Figure 5:
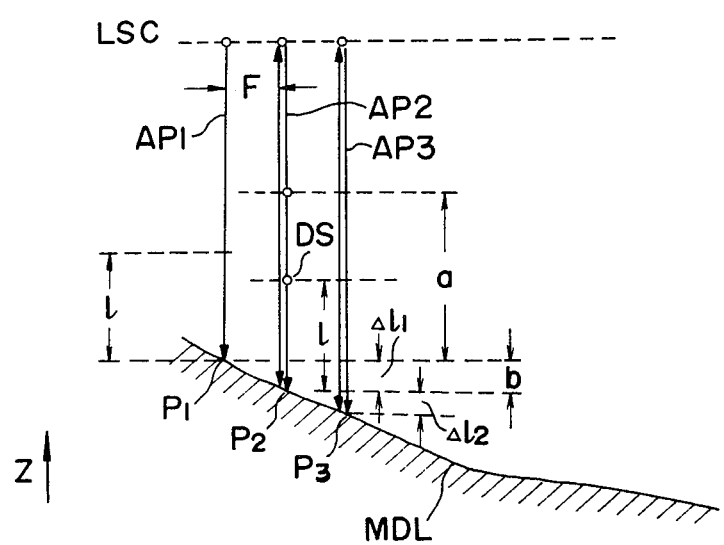
FIG. 5 explains the operation of the embodiment of FIG. 6.

FIG. 5 illustrates the operation of another embodiment of this invention, in which a distance l between the model surface and the deceleration starting position is provided as data for determining the deceleration starting position relative to the model surface. In the determination of the deceleration starting point in one approach, for example AP2, the current position a of the stylus ST in the Z-axis direction is considered on the basis of a reference level point $P_1$ (the point of contact of the stylus ST with the model MDL in a previous approach, for example AP1) and an increment b (representing the movement of the stylus ST in the Z-axis direction during pick feed) is similarly considered on the basis of the reference level of the contact point $P_1$. Position a and increment b are stored in a counter, and when the condition, a−b=l arises, the deceleration is initiated.

A command for the deceleration starting point in the first approach AP1 in this embodiment is given by the pressing of a deceleration button on an operating panel by an operator.

Figure 6:
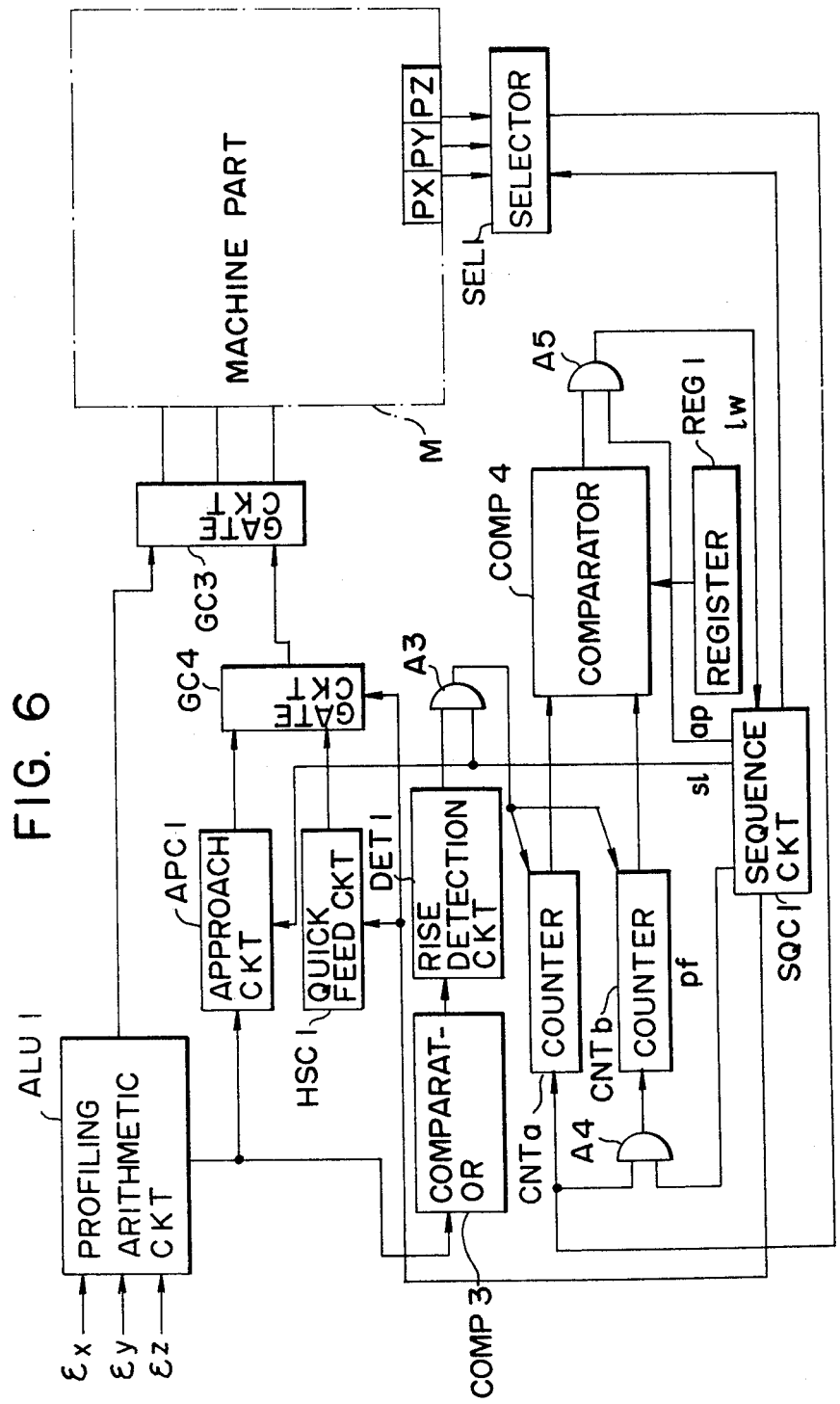
FIG. 6 is a block diagram illustrating a second embodiment of of this invention.

FIG. 6 shows in block form the embodiment of this invention having the operating principles illustrated in FIG. 5. Reference character M indicates a machine part similar to the tracer control machine including the motor drive circuits, shown in FIG. 3; SEL1 designates a selector; SQC1 identifies a sequence circuit; GC3 and GC4 denote gate circuits; ALU1 represents a profiling arithmetic circuit; APC1 shows an approach circuit; HSC1 refers to a quick feed circuit; COMP3 and COMP4 indicate comparators DET1 identifies a rise detection circuit; CNTa and CNTb denote counters; REG1 represents a register; and A3 through A5 show AND circuits.

Upon detection of the condition $\epsilon - \epsilon_0 = 0$ by the comparator COMP3 when the stylus ST has been brought into contact with the model MDL at the point $P_1$ in the deceleration mode in the first approach AP1 shown in FIG. 5, the counters CNTa and CNTb are reset via the rise detection circuit DET1 and the AND circuit A3.

Then, the pick feed is performed and, during this pick feed, the pick feed signal pf is "1" to open the AND circuit A4 and the output pulses from the Z-axis position detector PZ are selected by the selector SEL1 and applied to the counters CNTa and CNTb for counting simultaneously. In this instance, the count contents of the counters CNTa and CNTb at the moment of completion of the pick feed correspond to $\Delta l1$ in FIG. 5. That is, the tracer head TR lowers by $\Delta l1$ due to a shift of the pick feed distance in the period F, and $\Delta l1$ is stored as $-\Delta l1$.

Next, the profiling of the surface of the model MDL is achieved and since the pick feed signal pf becomes "0", the counter CNTb still holds the count value $\Delta l1$. The counter CNTa continues counting the output pulses from the position detector PZ. When it is detected by the limit switch LSc that the tracer head TR has been brought back to the profiling start point from the profiling terminate point by the quick feed, as is the case with the foregoing embodiment, a quick-feed approach by the approach circuit APC1 is started. Also in this approach operation, the output pulses from the position detector PZ are counted by the counter CNTa and the comparator COMP4 performs the calculation, $a-b=c$, based on the content set in the register REG1, as described previously. Since the content of the counter CNTb is $-\Delta l_1$, when the tracer head TR is quickly fed to a position DS spaced a distance l from the point P₂ on the model surface in the second approach AP2 in FIG. 5, the deceleration signal lw becomes "1" and the distance of deceleration becomes l.

When the tracer head TR has been fed in the deceleration feed mode to bring the stylus ST into contact with the model MDL, the counters CNTa and CNTb are cleared. Upon starting of the pick feed, the counters CNTa and CNTb begin to count the output pulses from the position detector PZ. As a consequence, the count value of the counter CNTb indicates the position of the stylus ST on the surface of the model MDL on the basis of the point of contact of the stylus with the model in the immediately preceding approach. Where the surface of the model MDL rises, the count content becomes positive and, in the opposite case, it becomes negative.

Also in this embodiment, the moment when the deceleration signal lw becomes "1" corresponds to the surface configuration of the model MDL at the profiling start point and the distance of deceleration is made constant at all times, permitting shortening of the time necessary for working.

It will be apparent that many modifications and variations may be effected without departing from the scope of novel concepts of this invention.

What is claimed is:

1. A tracer control system in which a tracer head quick feed operation is switched over to a deceleration operation to alleviate a shock when a stylus of the tracer head contacts a model, wherein the improvement comprises means for detecting and storing the amount of change in the configuration of a model at a profiling start point, said means employed to control the point of switching from the tracer head quick feed operation to the deceleration operation for the next profiling start point, said point of switching dependent upon said stored amount of change, thereby ensuring that the point of switching is always at substantially a constant distance above the profiling start point on the model surface.

2. A tracer control system according to claim 1, wherein the detecting means detects, as the amount of change in the configuration of the model at profiling start point; displacement of the tracer head in the Z-axis direction by a pick feed from the point of contact of the stylus of the tracer head with the model at the profiling start point.

3. A tracer control system according to claim 1, wherein in an approach operation of the tracer head to the model, the distance of its quick feed operation is equal to the stored amount of change in the configuration of the model at the profiling start point subtracted from the distance of the immediately preceding quick feed operation, and wherein the current quick feed operation is followed by a deceleration operation.

4. A tracer head control system according to claim 1, wherein the deceleration operation is initiated when the tracer head is quickly fed by the current approach operation to a predetermined deceleration operation starting position from a reference point that is the profiling start point in the immediately preceding approach operation.

5. A tracer control system according to claim 1, wherein the detecting means has a counter for counting pulses from a Z-axis position detector of the tracer head.

6. A tracer control system, for a tracer machine having a stylus and a cutter for cutting a workpiece, comprising:
a register for providing a deceleration distance signal;
first, second and third position detectors, operatively connected to the tracer machine, for providing first, second and third detection signals;
a selector circuit, operatively connected to said first, second and third position detectors, for providing an output consisting of said third detection signal;
deceleration determination means, operatively connected to said selector circuit, for providing a sequence control signal to said selector circuit, for receiving said third detection signal from said selector circuit, and for providing outputs consisting of a rapid approach signal, a pick feed signal, a deceleration signal, a current position signal, and an increment signal;
a first comparator circuit, operatively connected to said register and said deceleration determination means, for providing a comparator signal when said current position signal equals the sum of said deceleration distance signal and said increment signal;
a first AND gate, operatively connected to said first comparator circuit and said deceleration determination means, for providing said deceleration signal to said deceleration determination means when said rapid approach signal and said comparator signal are present at the inputs of said first AND gate;
a second AND gate, operatively connected to said selector circuit and said deceleration determination means, for providing said third detection signal to said deceleration determination means when said pick feed signal is present at an input of said AND gate;
a quick feed circuit, operatively connected to said deceleration determination means, for receiving said rapid approach signal and for providing a quick feed signal at its output;
a profiling arithmetic circuit, operatively connected to the tracer head, for receiving tracer head detection signals and for providing an output consisting of a displacement signal;
a second comparator circuit, operatively connected to said profiling arithmetic circuit, for providing a compared displacement signal;
a rise detection circuit, operatively connected to said second comparator circuit and said deceleration determination means, for providing a rise detection signal to said deceleration determination means in dependence upon said compared displacement signal;
an approach circuit, operatively connected to said profiling arithmetic circuit and said deceleration determination means, for receiving said deceleration signal and said displacement signal and for providing an output consisting of a deceleration control signal;
a first gate circuit, operatively connected to said approach circuit, said quick feed circuit, said deceleration determination means, and the tracer machine, for providing an output signal for driving the tracer machine in dependence upon said deceleration control signal, said rapid approach signal, and said quick feed signal.

7. A tracer control system, for a tracer machine having a stylus and cutter for cutting a workpiece, comprising:
- a register for providing a deceleration distance signal;
- first, second and third drive motors connected to the tracer machine;
- first, second and third position detectors, operatively connected to said first, second and third drive motors, for providing first, second and third detection signals;
- a selector circuit, operatively connected to said first, second and third position detectors, for providing an output consisting of said third detection signal;
- deceleration determination means, operatively connected to said selector circuit, for providing a sequence control signal to said selector circuit, for receiving said third detection signal from said selector circuit, and for providing outputs consisting of a rapid approach signal, a pick feed signal, a deceleration signal, a current position signal, and an increment signal;
- a first comparator circuit, operatively connected to said register and said deceleration determination means, for providing a comparator signal when the current position signal equals the sum of the deceleration distance signal and the increment signal;
- a first AND gate operatively connected to said first comparator circuit and said deceleration determination means, for providing said deceleration signal to said deceleration determination means when said rapid approach signal and said comparator signal are present at the inputs of said first AND gate;
- a second AND gate, operatively connected to said selector circuit and said deceleration determination means, for providing said third detection signal to said deceleration determination means when said pick feed signal is present at an input of said second AND gate;
- a quick feed circuit, operatively connected to said deceleration determination means, for receiving said rapid approach signal and for providing an output consisting of a quick feed signal;
- a profiling arithmetic circuit, operatively connected to the tracer head, for receiving tracer head detection signals and for providing an output consisting of a displacement signal;
- a second comparator circuit, operatively connected to said profiling arithmetic circuit, for providing an output consisting of a compared displacement signal;
- a rise detection circuit, operatively connected to said second comparator circuit and said deceleration determination means, for providing a rise detection signal to said deceleration determination means in dependence upon said compared displacement signal;
- an approach circuit, operatively connected to said profiling arithmetic circuit and said deceleration determination means, for receiving said deceleration signal and said compared displacement signal and for providing an output consisting of a deceleration control signal;
- a first gate circuit, operatively connected to said approach circuit, said quick feed circuit and said deceleration determination means, for providing an output consisting of either said deceleration control signal or said quick feed signal in dependence upon said deceleration signal and said rapid approach signal;
- first, second and third drive circuits, operatively connected to said first, second and third drive motors respectively, and operatively connected to said first gate, for providing first, second and third drive signals to said first, second and third drive motors respectively, in dependence upon the output of said first gate.

8. A tracer control system as set forth in claim 6 or 7, wherein said deceleration determination means comprises:
- a sequence circuit, operatively connected to said selector circuit, said first gate circuit, said approach circuit, said quick feed circuit, said first AND gate, and said second AND gate, for providing outputs consisting of said rapid approach signal, said selector control signal, said pick feed signal, said deceleration signal, and a reset signal;
- a first counter, operatively connected to said selector circuit, said sequence circuit, and said first comparator, for receiving said third detection signal and said reset signal, and for providing said current position signal to said first comparator;
- a second counter, operatively connected to said second AND gate, said sequence circuit, and said first comparator for receiving said third detection signal when said pick feed signal is present at an input of said second AND gate and for providing said increment signal to said first comaparator.

9. A tracer control system as set forth in claim 6 or 7, wherein said deceleration determination means comprises:
- a sequence circuit, operatively connected to said selector circuit, said approach circuit, said quick feed circuit, said first gate circuit, said first AND gate, and said second AND gate, for receiving said deceleration signal and for providing outputs consisting of said rapid approach signal, said deceleration signal, said pick feed signal, and said selector control signal;
- a third AND gate, operatively connected to said rise detection circuit, said approach circuit and said sequence circuit, for receiving said rise detection signal and said deceleration signal and for providing a profiling point signal;
- a first counter, operatively connected to said selector circuit, said third AND gate, and said first comparator, for receiving said third detection signal and said profiling point signal and for providing an output consisting of said current position signal;
- a second counter, operatively connected to said second AND gate, said third AND gate, and said first comparator, for receiving said third detection signal when said pick feed signal is present at an input of said second AND gate and for providing an output consisting of said increment signal.

* * * * *

UNITED STATES PATENT AND TRADEMARK OFFICE
CERTIFICATE OF CORRECTION

PATENT NO. : 4,266,172
DATED : May 5, 1981
INVENTOR(S) : ETUO YAMAZAKI

It is certified that error appears in the above—identified patent and that said Letters Patent is hereby corrected as shown below:

```
Front Page, [73], Assignee, before "Japan" insert --Tokyo,--.
Front Page, [57], Abstract, line 11, "above mentioned"
          should be --above-mentioned--.
Col. 2, line 20, delete "of" (second occurrence);
        line 50, "ap" should be --up--.
Col. 3, line 9,  "lw" should be --ℓw--;
        line 10, "sl" should be --sℓ--;
        line 11, "sl" should be --sℓ--;
        line 53, "lw" should be --ℓw--;
        line 66, "lw" should be --ℓw--.
Col. 4, line 5,  "l" should be --ℓ--;
        line 19, "condition, a-b=1 arises," should be
          --condition a-b=ℓ arises--;
        line 34, after "comparators" insert --;--;
        lines 52, 53, 54 and 58, "Δ11" should be --Δℓ1--;
        line 55, "-Δ11" should be -- -Δℓ1--.
Col. 5, line 3,  "Δ11" should be --Δℓ1--;
        lines 4 and 7, "1" should be --ℓ--;
        lines 6 and 22, "lw" should be --ℓw--;
        line 49, "point;" should be --point,--.
Col. 8, line 35, "comaparator." should be --comparator.--.
```

Signed and Sealed this

Twenty-ninth Day of September 1981

[SEAL]

Attest:

GERALD J. MOSSINGHOFF

Attesting Officer   Commissioner of Patents and Trademarks